(12) United States Patent
Huang et al.

(10) Patent No.: US 8,336,392 B2
(45) Date of Patent: Dec. 25, 2012

(54) INTEGRATED MICROMACHINING AIR FLOW PATH CLOG SENSOR

(75) Inventors: Liji Huang, San Jose, CA (US); Jian Luo, Chengdu (CN); Changming Jiang, Chengdu (CN); Yenan Liu, Chengdu (CN); Wenhong Deng, Chengdu (CN); Jialuo Jack Xuan, Hayward, CA (US); Chih-Chang Chen, Cupertino, CA (US)

(73) Assignee: Siargo Ltd., Santa Clara, CA (US)

( * ) Notice: Subject to any disclaimer, the term of this patent is extended or adjusted under 35 U.S.C. 154(b) by 9 days.

(21) Appl. No.: 12/787,268

(22) Filed: May 25, 2010

(65) Prior Publication Data

US 2012/0011940 A1    Jan. 19, 2012

(51) Int. Cl.
*G01F 1/56* (2006.01)
(52) U.S. Cl. .................................. 73/861.08
(58) Field of Classification Search ............... 73/861.08, 73/861.64, 204.27
See application file for complete search history.

(56) References Cited

U.S. PATENT DOCUMENTS

| 8,083,841 B2 * | 12/2011 | Cheng | 96/417 |
| 2011/0146398 A1 * | 6/2011 | Beck et al. | 73/204.27 |

* cited by examiner

*Primary Examiner* — Jewel V Thompson

(57) ABSTRACT

Nowadays many electronic devices, such as LCD projector, computer servers, and air fresher etc. require reliable air cooling system to reduce the risk of electronics damage caused by overheating. The present invention disclosed an apparatus integrated with air flow sensor as an alarm apparatus for air flow clog detection. The major prior approach for air flow circulation failure detection is based on an indirect measurement method of temperature monitoring on surrounding environments, which method is suffering from the slow response and poor identification of real-time situation. The present invention will demonstrate the advantages by directly monitoring air flow over by indirectly monitoring the surrounding temperature as for the purpose of preventing air flow path clog.

8 Claims, 2 Drawing Sheets

INTEGRATED MICROMACHINING AIR FLOW PATH CLOG SENSOR

FIELD OF THE INVENTION

Figure 1:
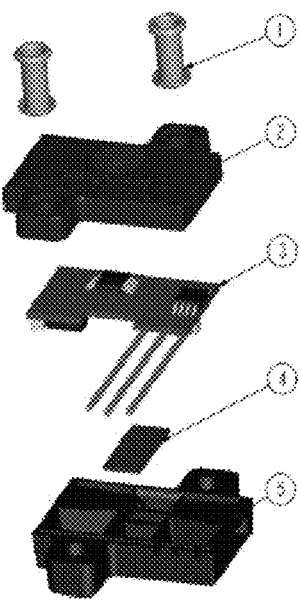

The present invention is based on the U.S. provisional patent application (U.S. Pat. No. 6,122,038) filed on Jun. 25, 2009. The current invention presents a method and an apparatus to prevent air flow path clog by measuring air flow velocity of its flow path. The air flow is generally generated by a fan to provide cooling effect on many electronics devices. The air flow sensor in current invention can function as part of an alarm system to prevent air flow path clog and reduce the risk of electronics damages caused by overheating. The air flow sensors in present invention are fabricated with micromachining, thin film process or Micro Electro Mechanical Systems (MEMS) approach.

BACKGROUND OF THE INVENTION

Many of current electronic apparatuses utilize a fan to generate air cooling together with a filter to prevent excessive air dust or particles entering into the apparatus. Examples are LCD projectors, computer servers or even computers, air fresher, intensive light bulbs, to name a few. For these apparatus, one of the major failure modes is the overheating when the filter clogs and fails to allow air circulation. Prior approach is to use a temperature sensor to monitor the raise of the temperature inside the apparatus but often temperature sensor can only provide local temperature sensing and the response lags far behind the malfunction of cooling fan. Furthermore, a clogged filter may not be always quick enough to result in a rapid temperature elevation, particularly in a relatively cold area. Hence, the situation of a clogged filter may not be correctly and properly detected by a temperature sensor. Fujiwara et al. (U.S. Pat. No. 7,062,963; Omron: MEMS flow sensors) teaches a device that can be used for this purpose. However, the device has a limited flow dynamic detection due to its complicated flow passages design. The curved wall surface and bypass configuration will cause the particles in air flow to block the bypass channel and add additional failure mode to its installed devices. Therefore, it is very desirable to design a new air flow path clog sensor to meet the current needs in industry.

SUMMARY OF THE INVENTION

The present invention disclosed an alarm apparatus integrated with an air flow sensor that can directly sense both flow velocity and ambient temperature to prevent air filter clog for air cooling in electronic devices. The air flow sensor is fabricated using micro electromechanical system (MEMS) approach on silicon substrate, and more specifically it can be applied to many applications requiring air flow information in a relatively open space. The invented MEMS devices contain freestanding membranes, cavities, micro channels and/or multi-layered structures. This invention utilizes a direct measurement scheme which is packaged in a miniature enclosure. This direct measurement configuration could effectively solve the often encountered issues of bypass micro-channel clog by dust or particles on the sensors with a bypass configuration. The package only requires very easy installation. The invention can be manufactured using a CMOS (complimentary metal-oxide-semiconductor) compatible process, thereof it provides easy manufacturability and can be mass produced.

For the air flow detection, this invention measures the thermal conductivity or thermal capacity of air passing through the designated channel in the package. The pre-calibrated sensor provides linear analog or digital output with plug-and-play capability. The current invention of the air flow sensor is composed of platinum and is powered with electrical current therefore its temperature is elevated constantly above the temperature of the ambient environment for measurement. The mass flow sensor in this invention provides an ultra wide dynamic range that can measure air mass flow velocity from 5 mm/sec up to 125 m/sec. For a specific application, the user can set an air flow threshold that can be directly compared with the data obtained from the sensor and act accordingly.

BRIEF DESCRIPTIONS OF THE DRAWINGS

FIG. 1: Components of the integrated micromachining air flow path clog sensor

Figure 2:
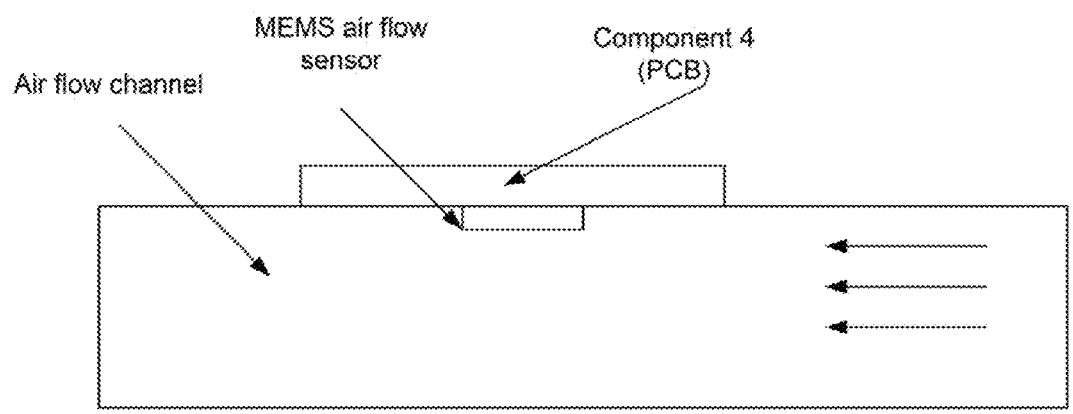

FIG. 2: Shows the configuration of MEMS flow sensor in the flow channel

Figure 3:
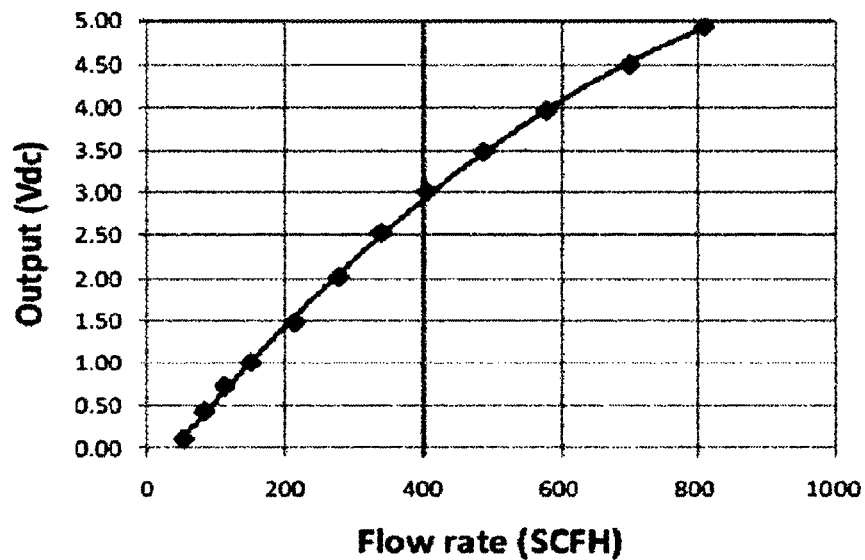

FIG. 3. The sensor analog output at high flow full scale up to 120 m/sec

Figure 4:
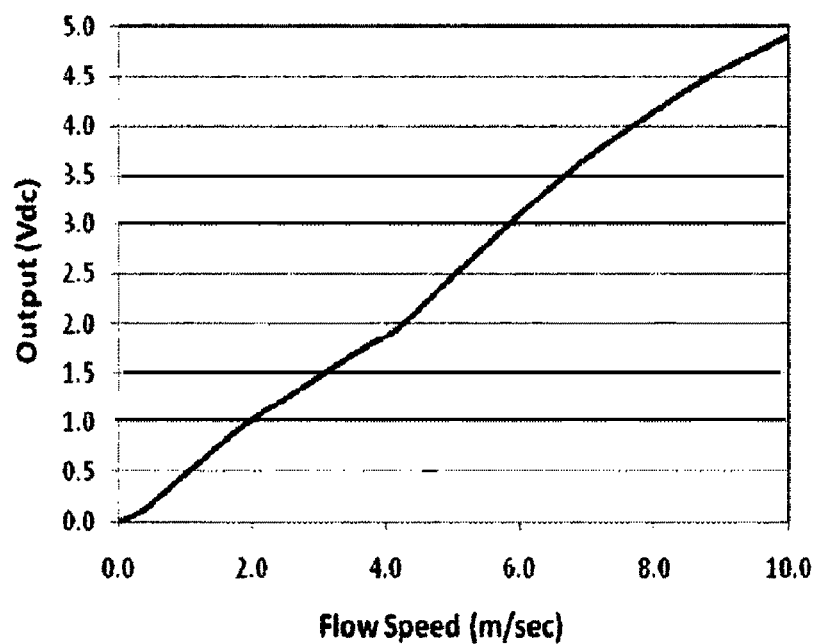

FIG. 4. The sensor analog output at low flow full scale up to 10 m/sec

DETAILED DESCRIPTION OF THE PREFERRED EMBODIMENTS

FIG. 1 shows the major components of integrated micromachining air flow path clog sensor. Component 2 is the top cover of the package, which is combined with bottom part (component 5) to be the complete package. The air flow channel is formed in the middle level of package by the combination of component 2 and component 5. The silicon-based MEMS flow sensor is attached by epoxy resin and wire bonded to a printed circuit board (component 4). The silicon-based MEMS flow sensors have the benefits of small feature size, low power consumption, and higher measurement accuracy. Since the MEMS flow sensors are manufactured by thin film process, therefore they are easy for low cost mass production compared to conventional flow sensors.

In the present invention, the design of flow channel had avoided bypass configuration. The MEMS flow sensor will be exposed to flow channel in a way of direct contact to medium flow as shown in FIG. 2. The high dynamic measurement range of MEMS flow sensor in current invention makes this direct contact to medium flow become possible. Furthermore, in the present invention since there is no need of micro-channel in the direct contact configuration, therefore it could avoid the micro channel clog issues by dust or debris containing in air flow which usually cause the malfunction of air flow sensor in bypass configuration. Component 4 is connect to another printed circuit board of component 3 which is used to collect measurement data and complete the analysis to judge if the air filter is clogged.

Compared to other air flow path clog sensor via the way of temperature monitoring, the embodiments of current invention by direct measurement of air flow velocity has the advantages of fast response and higher accuracy in the judgment of air filter clog. Since the air clog sensor in current invention has response time less than 20 msec which is much less than air clog sensor by temperature monitoring method, therefore it would be fast enough to turn off electronic devices in time to prevent damages from overheating if air filter clog happens. Moreover, the air clog sensor by temperature monitoring method usually could only detect very local temperature which would not be good enough to identify the real condition in air flow path and cause misjudgment in air filter clog situation.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims

We claim:

1. An integrated ill micromachining air how path clog sensor comprising:
   a silicon-based MEMS (micro-electro-mechanical systems) flow sensor;
   a miniature assembly package;
   a direct air flow channel: and
   an electronic printed circuit board;
   wherein said silicon-based MEMS flow sensor is packaged on sidewall of said direct air flow channel and connected to said electronic printed circuit board with a micro controller for collecting flow data and calculating air flow velocity; and
   wherein once measured air flow velocity is lower than a pre-set threshold value, then said electronic printed circuit board will automatically send out an alarm signal to trigger and shut down the operations of electronic devices that have said air flow path clog sensor installed to prevent damage from overheating of electronics.

2. The integrated micromachining air flow path clog sensor of claim 1 wherein:
   said integrated micromachining air flow path clog sensor is located behind an air filter of air circulation system for said electronics devices.

3. The integrated micromachining air flow path clog sensor of claim 1 wherein:
   said silicon-based MEMS flow sensor is fabricated on a silicon substrate by micromachining or micro-electro-mechanical system (MEMS) method;
   wherein said silicon-based MEMS flow sensor is further comprising one heater thermistor, two temperature sensing thermistors, and one ambient thermistor;
   wherein said heater thermistor and two temperature sensing thermistors are disposed on a silicon nitride diaphragm structure suspending over a cavity that is formed by silicon bulk etching from backside of said silicon substrate; and
   wherein said ambient thermistor that is disposed on a non-diaphragm region of said silicon substrate, is applied to measure ambient temperature and feedback to heater thermistor control circuit.

4. The integrated micromachining air flow path clog sensor of claim 1 wherein;
   said direct air flow channel built inside of said miniature assembly package provides said silicon-based MEMS flow sensor with direct air flow measurement capability which is differentiated from indirect flow measurement in a conventional bypass configuration.

5. The integrated micromachining air flow path clog sensor of claim 1 wherein;
   said silicon-based MEMS flow sensor is able to place for direct contact with measured medium thus to reduce faulty of possible particles clog in a micro channel which happens often in said conventional bypass configuration.

6. The integrated micromachining air flow path clog sensor of claim 1 wherein:
   said miniature assembly package for the said silicon-based MEMS flow sensor provides easy installation which is designated for instrumentation, consumer electronic and other apparatus circuitry board.

7. The integrated ID micromachining air flow path clog sensor of claim 1 wherein:
   said integrated micromachining air flow path clog sensor have a response time less than 20 msec;
   therefore said air flow path clog sensor is able to turn off said electronic devices before it is damaged by overheating.

8. The integrated micromachining air flow path clog sensor of claim 1 wherein:
   said silicon-based MEMS flow sensor has a dynamic range of better than 10000:1; therefore said air flow path clog sensor could be applied to wide flow range of applications.

* * * * *